(12) United States Patent
Takahashi et al.

(10) Patent No.: US 10,323,208 B2
(45) Date of Patent: Jun. 18, 2019

(54) REFRIGERATOR OIL AND WORKING FLUID COMPOSITION FOR REFRIGERATOR

(71) Applicant: JXTG Nippon Oil & Energy Corporation, Tokyo (JP)

(72) Inventors: Hitoshi Takahashi, Tokyo (JP); Hiroko Shimpo, Tokyo (JP); Souichirou Konno, Tokyo (JP); Ken Sawada, Tokyo (JP); Kentaro Yamaguchi, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 41 days.

(21) Appl. No.: 15/522,670

(22) PCT Filed: Oct. 22, 2015

(86) PCT No.: PCT/JP2015/079857
§ 371 (c)(1),
(2) Date: Apr. 27, 2017

(87) PCT Pub. No.: WO2016/072284
PCT Pub. Date: May 12, 2016

(65) Prior Publication Data
US 2017/0327765 A1    Nov. 16, 2017

(30) Foreign Application Priority Data
Nov. 4, 2014    (JP) .................................. 2014-224306

(51) Int. Cl.
| | | |
|---|---|---|
| *C10M 171/00* | (2006.01) | |
| *C09K 5/04* | (2006.01) | |
| *C11C 3/00* | (2006.01) | |
| *C08K 5/053* | (2006.01) | |
| *C08K 5/09* | (2006.01) | |

(52) U.S. Cl.
CPC .......... *C10M 171/008* (2013.01); *C09K 5/04* (2013.01); *C11C 3/003* (2013.01); *C08K 5/053* (2013.01); *C08K 5/09* (2013.01); *C10M 2207/283* (2013.01); *C10M 2207/2835* (2013.01); *C10N 2220/021* (2013.01); *C10N 2220/30* (2013.01); *C10N 2220/302* (2013.01); *C10N 2230/08* (2013.01); *C10N 2230/70* (2013.01); *C10N 2240/30* (2013.01)

(58) Field of Classification Search
CPC ........ C10M 171/008; C10M 2207/283; C10M 2207/2835; C11C 3/003; C09K 5/04; C10N 2230/70; C10N 2230/08; C10N 2220/302; C10N 2220/021; C10N 2220/30; C10N 2240/30; C08K 5/09; C08K 5/053
USPC ............................................. 252/68; 508/485
See application file for complete search history.

(56) References Cited

U.S. PATENT DOCUMENTS

| | | | | |
|---|---|---|---|---|
| 6,251,300 | B1 * | 6/2001 | Takigawa ............. | C10M 169/04 252/67 |
| 6,582,621 | B1 * | 6/2003 | Sasaki ................... | C09K 5/045 252/67 |
| 7,052,626 | B1 * | 5/2006 | Hasegawa ............. | C09K 5/045 252/67 |
| 8,193,129 | B2 * | 6/2012 | Tagawa ................ | C10M 101/02 208/18 |
| 9,562,182 | B2 * | 2/2017 | Saito .................... | C10M 169/04 |
| 9,976,106 | B2 * | 5/2018 | Kaneko ............... | C10M 171/008 |
| 2011/0248206 | A1 * | 10/2011 | Kaneko ............... | C10M 171/008 252/68 |
| 2013/0012419 | A1 * | 1/2013 | Matsumoto ........... | C09K 5/045 508/463 |
| 2013/0012420 | A1 * | 1/2013 | Matsumoto ........... | C09K 5/045 508/569 |
| 2015/0076393 | A1 | 3/2015 | Saito et al. | |

FOREIGN PATENT DOCUMENTS

| | | |
|---|---|---|
| EP | 2325290 A1 | 5/2011 |
| EP | 2623583 A1 | 8/2013 |
| EP | 2772526 A1 | 9/2014 |
| EP | 2930228 A1 | 10/2015 |
| JP | H6-330061 A | 11/1994 |
| JP | 2011-089106 A | 5/2011 |
| JP | 2012-072273 A | 4/2012 |
| JP | 2012-201833 A | 10/2012 |
| JP | 2012-251170 A | 12/2012 |
| TW | 201435081 A | 6/2014 |
| WO | WO 00/068345 A1 | 11/2000 |
| WO | WO 2013/147048 A1 | 10/2013 |

(Continued)

OTHER PUBLICATIONS

International Bureau of WIPO, International Preliminary Report on Patentability issued in International Application No. PCT/JP2015/079857 (dated May 18, 2017).

(Continued)

*Primary Examiner* — Douglas J McGinty
(74) *Attorney, Agent, or Firm* — Leydig, Voit & Mayer, Ltd.

(57) ABSTRACT

The present invention provides a refrigerating machine oil containing an ester base oil obtained from pentaerythritol and mixed fatty acids of a fatty acid having 8 carbon atoms and a fatty acid having 9 carbon atoms, wherein a ratio of a weight average molecular weight Mw to a number average molecular weight Mn, Mw/Mn, of the ester base oil is 1.06 to 1.20, and used with a mildly flammable hydrofluorocarbon refrigerant.

3 Claims, 1 Drawing Sheet

(56) References Cited

FOREIGN PATENT DOCUMENTS

WO  WO 2014/087916 A1   6/2014
WO  WO-2014142313 A1 *  9/2014   ........ C10M 171/008

OTHER PUBLICATIONS

Japanese Patent Office, International Search Report issued in International Application No. PCT/JP2015/079857 (dated Nov. 17, 2015).
Taiwanese Intellectual Property Office, Office Action issued in Taiwanese Application No. 104135908 (dated Aug. 2, 2016).
European Patent Office, Search Report issued in European Application No. 15857556.3 (dated Oct. 4, 2017) 10 pp.

* cited by examiner

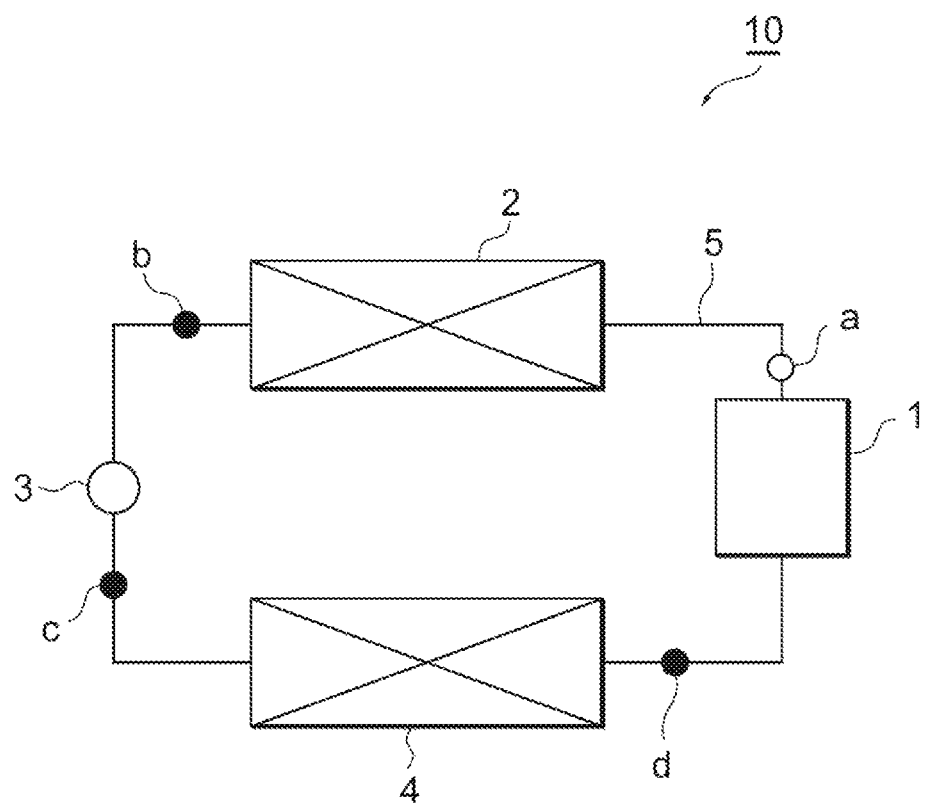

REFRIGERATOR OIL AND WORKING FLUID COMPOSITION FOR REFRIGERATOR

CROSS-REFERENCE TO RELATED APPLICATIONS

This patent application is the U.S. national phase of International Application No. PCT/JP2015/079857, filed on Oct. 22, 2015, which claims the benefit of Japanese Patent Application No. 2014-224306, filed Nov. 4, 2014, the disclosures of which are incorporated herein by reference in their entireties for all purposes.

TECHNICAL FIELD

The present invention relates to an refrigerating machine oil, a working fluid composition for a refrigerating machine, use of an ester base oil for a refrigerating machine oil or a working fluid composition for a refrigerating machine, use of an ester base oil for producing a refrigerating machine oil or a working fluid composition for a refrigerating machine and a method for improving flame retardancy of a refrigerating machine.

BACKGROUND ART

Refrigerating machine oils are commonly used for refrigerating machines such as fridge storages and refrigeration and air conditioning apparatus as a lubricant oil of a refrigerant compressor. Refrigerating machine oils are used in wide temperature regions from high temperatures to low temperatures in the refrigerant circulation cycle of a refrigerating machine. For this reason, low temperature property is one of the required properties for the refrigerating machine oils. Patent Literature 1 discloses, as the refrigerating machine oil satisfying such a required property, a refrigerating machine oil containing esters of carboxylic acids and alcohols that satisfy predetermined conditions.

CITATION LIST

Patent Literature

Patent Literature 1: WO 00/68345

SUMMARY OF INVENTION

Technical Problem

Some of the refrigerants that have been used in recent years are mildly flammable. It is important for refrigerating machines which use such a mildly flammable refrigerant to ensure flame retardancy.

An object of the present invention is to provide a refrigerating machine oil that can achieve both the low temperature property and flame retardancy and a working fluid composition for a refrigerating machine containing such a refrigerating machine oil.

Solution to Problem

The ester base oil obtained from fatty acids and a polyhydric alcohol may contain a plurality of esters having different structures (specifically, the type and proportion of fatty acids bonded to a plurality of hydroxyl groups of the polyhydric alcohol), further unreacted fatty acids and a polyhydric alcohol; however, it is desirable for the ester base oil only to contain esters of a single structure (i.e., the molecular weight distribution of the ester base oil is narrow) as far as possible to control properties of the refrigerating machine oil. The present inventors conducted studies on such an ester base oil and found that the molecular weight distribution of the ester base oil is variable depending on the manufacturing method or manufacturing conditions even when the type and proportion of fatty acids and a polyhydric alcohol used as raw materials are the same and the properties of the ester base oil are also variable depending on differences in the molecular weight distribution. The present inventors conducted further studies based on these findings and found that it is not always preferable for the ester base oil obtained from specific fatty acids and polyhydric alcohol to contain esters having a single molecular weight in light of having both the low temperature property and flame retardancy, but rather the low temperature property and flame retardancy are compatible when the ester base oil has predetermined molecular weight distribution, whereby the present invention has been accomplished.

Specifically, the present invention provides a refrigerating machine oil containing an ester base oil obtained from pentaerythritol and mixed fatty acids of a fatty acid having 8 carbon atoms and a fatty acid having 9 carbon atoms wherein a ratio of a weight average molecular weight Mw to a number average molecular weight Mn, Mw/Mn, of the ester base oil is 1.06 to 1.20, and used with a mildly flammable hydrofluorocarbon refrigerant.

The present invention further provides a working fluid composition for a refrigerating machine containing the above refrigerating machine oil and a mildly flammable hydrofluorocarbon refrigerant.

The present invention also provides use of an ester base oil for a refrigerating machine oil or for a working fluid composition for a refrigerating machine, wherein the ester base oil is obtained from pentaerythritol and mixed fatty acids of a fatty acid having 8 carbon atoms and a fatty acid having 9 carbon atoms, a ratio of a weight average molecular weight Mw to a number average molecular weight Mn, Mw/Mn, of the ester base oil is 1.06 to 1.20, the refrigerating machine oil is used with a mildly flammable hydrofluorocarbon refrigerant, and the working fluid composition for a refrigerating machine contains the refrigerating machine oil and the mildly flammable hydrofluorocarbon refrigerant.

The present invention further provides use of an ester base oil for manufacturing a refrigerating machine oil or for a working fluid composition for a refrigerating machine, wherein the ester base oil is obtained from pentaerythritol and mixed fatty acids of a fatty acid having 8 carbon atoms and a fatty acid having 9 carbon atoms, a ratio of a weight average molecular weight Mw to a number average molecular weight Mn, Mw/Mn, of the ester base oil is 1.06 to 1.20, the refrigerating machine oil is used with a mildly flammable hydrofluorocarbon refrigerant, and the working fluid composition for a refrigerating machine contains the refrigerating machine oil and the mildly flammable hydrofluorocarbon refrigerant.

The present invention furthermore provides a method for improving flame retardancy of a refrigerating machine comprising a mildly flammable hydrofluorocarbon refrigerant, the method comprising using a composition comprising, as a refrigerating machine oil, an ester base oil obtained from pentaerythritol and mixed fatty acids of a fatty acid having 8 carbon atoms and a fatty acid having 9 carbon atoms, wherein a ratio of a weight average molecular weight Mw to a number average molecular weight Mn, Mw/Mn, of the ester base oil is 1.06 to 1.20.

Advantageous Effects of Invention

According to the present invention, a refrigerating machine oil that can achieve both the low temperature property and flame retardancy and a working fluid composition for a refrigerating machine containing such a refrigerating machine oil are provided.

BRIEF DESCRIPTION OF DRAWING

FIG. 1 is a schematic drawing illustrating an example of a configuration of a refrigerating machine.

DESCRIPTION OF EMBODIMENTS

The refrigerating machine oil according to the present embodiment contains an ester base oil obtained from pentaerythritol and mixed fatty acids of a fatty acid having 8 carbon atoms and a fatty acid having 9 carbon atoms, wherein a ratio of a weight average molecular weight Mw to a number average molecular weight Mn, Mw/Mn, of the ester base oil is 1.06 to 1.20, and is used with a mildly flammable hydrofluorocarbon refrigerant.

The ester base oil is obtained from pentaerythritol and mixed fatty acids of a fatty acid having 8 carbon atoms and a fatty acid having 9 carbon atoms, and contains at least an ester represented by the following formula (1).

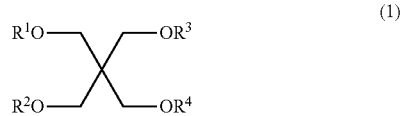

(1)

In the formula (1), $R^1$, $R^2$, $R^3$ and $R^4$ each independently represent an alkyl group having 8 or 9 carbon atoms. At least one of $R^1$, $R^2$, $R^3$ and $R^4$ represents an alkyl group having 8 carbon atoms and at least one of $R^1$, $R^2$, $R^3$ and $R^4$ represents an alkyl group having 9 carbon atoms.

The ester base oil may contain, in addition to the ester represented by the formula (1), a tetraester of a fatty acid having 8 carbon atoms and pentaerythritol, a tetraester of a fatty acid having 9 carbon atoms and pentaerythritol, a partial ester of a fatty acid having 8 carbon atoms and/or a fatty acid having 9 carbon atoms and pentaerythritol, or an unreacted fatty acid having 8 carbon atoms, fatty acid having 9 carbon atoms or pentaerythritol.

The fatty acid having 8 carbon atoms may be either linear or branched, and examples of those preferably used include n-octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid and 2-propylpentanoic acid.

The fatty acid having 9 carbon atoms may be either linear or branched, and examples of the preferably used include n-nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutanoic acid, 2,2,4,4-tetramethylpentanoic acid, 2,2,3,3-tetramethylpentanoic acid, 2,2,3,4-tetramethylpentanoic acid and 2,2-diisopropylpropanoic acid.

The ratio of a weight average molecular weight Mw to a number average molecular weight Mn, Mw/Mn, of the ester base oil is, in light of the low temperature property, particularly suppressing the precipitation at a low temperature, preferably 1.06 or more, more preferably 1.07 or more, further preferably 1.08 or more and particularly preferably 1.09 or more. The ratio of a weight average molecular weight Mw to a number average molecular weight Mn, Mw/Mn, of the ester base oil is, in light of the low temperature property, particularly suppressing the precipitation at a low temperature and improving the flame retardancy, preferably 1.20 or less, more preferably 1.18 or less, further preferably 1.15 or less and particularly preferably 1.13 or less. The Mw/Mn of the ester base oil is, in light of the low temperature property, particularly suppressing the precipitation at a low temperature and improving the flame retardancy, preferably 1.06 to 1.20, 1.06 to 1.18, 1.06 to 1.15, 1.06 to 1.13, 1.07 to 1.20, 1.07 to 1.18, 1.07 to 1.15, 1.07 to 1.13, 1.08 to 1.20, 1.08 to 1.18, 1.08 to 1.15 or 1.08 to 1.13.

When the ester base oil contains, in addition to the ester represented by the formula (1), a tetraester of a fatty acid having 8 carbon atoms and pentaerythritol, a tetraester of a fatty acid having 9 carbon atoms and pentaerythritol, a partial ester of a fatty acid having 8 carbon atoms and/or a fatty acid having 9 carbon atoms and pentaerythritol, or an unreacted fatty acid having 8 carbon atoms, fatty acid having 9 carbon atoms or pentaerythritol, the Mw/Mn measured for the ester base oil containing these components is defined as the Mw/Mn of the ester base oil of the present invention.

The Mw/Mn of the ester base oil is measured by, for example, the following method. Each base oil is diluted using chloroform as a solvent to prepare a solution having a sample concentration of 1 mass %. The solution is analyzed using a GPC apparatus (Waters Alliance 2695). The analysis is carried out by a refractive index detector at a solvent flow rate of 1 ml/min using a column with an analyzable molecular weight from 100 to 10000. Note that the relationship of the column retention time and the molecular weight is evaluated using a polypropylene glycol standard having a definite molecular weight and a calibration curve is separately prepared to determine a molecular weight from the obtained retention time.

The manufacturing method of the ester base oil is not particularly limited and a known manufacturing method may be used. The ester base oil is obtained by, for example, the following method. First, the ester represented by the formula (1) can be obtained by reacting the mixed fatty acid of a fatty acid having 8 carbon atoms and a fatty acid having 9 carbon atoms with pentaerythritol. The Mw/Mn of the thus obtained ester is typically less than 1.06. For this reason, the ester base oil having an Mw/Mn of 1.06 to 1.20 can be obtained by adding a tetraester of a fatty acid having 8 carbon atoms and pentaerythritol or a tetraester of a fatty acid having 9 carbon atoms and pentaerythritol to the ester.

The flash point of the ester base oil is, in light of improving the flame retardancy, preferably 200° C. or more, more preferably 210° C. or more and further preferably 220° C. or more. The flash point in the present invention means a flash point measured in accordance with JIS K2265-4: 2007.

The spontaneous ignition point of the ester base oil is, in light of improving the flame retardancy, preferably 350° C. or more, more preferably 360° C. or more and further preferably 370° C. or more. The spontaneous ignition point in the present invention means a spontaneous ignition point measured by the method in accordance with ASTM E 659-1978.

The refrigerating machine oil may further contain other base oils in addition to the above ester base oil. Examples of the other base oils include hydrocarbon oils such as mineral oils, olefin polymers, naphthalene compounds and alkylbenzenes, and oxygen atom-containing synthetic oils such as esters other than the ester of fatty acids having 8 to 9 carbon atoms and pentaerythritol, polyalkyleneglycol, polyvinyl ethers, ketones, polyphenyl ethers, silicones, polysiloxanes and perfluoroethers. Among these, esters other than the ester of fatty acids having 8 to 9 carbon atoms and pentaerythritol are preferably used as the other base oils, and particularly the esters of fatty acids having 4 to 7 carbon atoms and pentaerythritol and the esters of fatty acids having 4 to 9 carbon atoms and dipentaerythritol are preferably used.

The content of the ester base oil can be, for example, 30 mass % or more, 40 mass % or more or 50 mass % or more based on a total amount of the refrigerating machine oil.

The refrigerating machine oil may further contain various additives as necessary. Examples of the additive include an acid scavenger, an antioxidant, an extreme pressure agent, an oiliness agent, a defoaming agent, a metal deactivator, an antiwear agent, a viscosity index improver, a pour point depressant, a detergent dispersant, a friction modifier and a rust preventive. The content of the additives can be, for example, 5 mass % or less or 2 mass % or less based on a total amount of the refrigerating machine oil.

It is preferable for the refrigerating machine oil to further contain an acid scavenger among the above additives in light of improving the thermal and chemical stability. Examples of the acid scavenger include epoxy compounds and carbodiimide compounds.

Examples of the epoxy compound include glycidyl ether type epoxy compounds, glycidyl ester type epoxy compounds, oxirane compounds, alkyl oxirane compounds, alicyclic epoxy compounds, epoxidized fatty acid monoesters and epoxidized vegetable oils. These epoxy compounds can be used singly, or two or more can be used in combination.

For example, aryl glycidyl ether type epoxy compounds or alkyl glycidyl ether type epoxy compounds represented by the following formula (2) can be used as the glycidyl ether type epoxy compound.

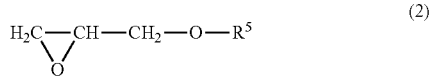

(2)

In the formula (2), $R^5$ represents an aryl group or an alkyl group having 5 to 18 carbon atoms.

As the glycidyl ether type epoxy compounds represented by the formula (2), n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether and 2-ethylhexyl glycidyl ether are preferable.

In addition to the epoxy compounds represented by the formula (2), neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkyleneglycol monoglycidyl ether, polyalkyleneglycol diglycidyl ether, etc., can also be used as the glycidyl ether type epoxy compound.

For example, compounds represented by the following formula (3) can be used as the glycidyl ester type epoxy compound.

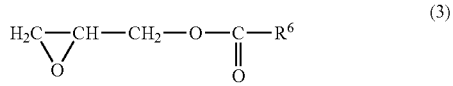

(3)

In the formula (3), $R^6$ represents an aryl group, an alkyl group having 5 to 18 carbon atoms or an alkenyl group.

As the glycidyl ester type epoxy compounds represented by the formula (3), glycidyl benzoate, glycidyl neodecanoate, glycidyl-2,2-dimethyloctanoate, glycidyl acrylate and glycidyl methacrylate are preferable.

The alicyclic epoxy compounds are those having a partial structure wherein the carbon atoms forming an epoxy group are directly forming the alicyclic ring, represented by the following formula (4).

(4)

Examples of the alicyclic epoxy compound include 1,2-epoxycyclohexane, 1,2-epoxycyclopentane, 3',4'-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane), 4-(1'-methylepoxyethyl)-1,2-epoxy-2-methylcyclohexane and 4-epoxyethyl-1,2-epoxycyclohexane.

Examples of the allyloxirane compound include 1,2-epoxy styrene and alkyl-1,2-epoxy styrene.

Examples of the alkyl oxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyicosane.

Examples of the epoxidized fatty acid monoester include esters of epoxidized fatty acids having 12 to 20 carbon atoms and alcohol having 1 to 8 carbon atoms or phenol or alkylphenol. The epoxidized fatty acid monoesters used preferably are butyl-, hexyl-, benzyl-, cyclohexyl-, methoxyethyl-, octyl-, phenyl- and butylphenyl esters of epoxystearic acid.

Examples of the epoxidized vegetable oil include epoxy compounds of vegetable oils such as soybean oil, flaxseed oil and cotton seed oil.

The carbodiimide compound is not particularly limited and, for example, dialkyl carbodiimide, diphenylcarbodiimide or bis(alkylphenyl)carbodiimide can be used. Examples of dialkylcarbodiimide include diisopropylcarbodiimide and dicyclohexylcarbodiimide. Examples of bis(alkylphenyl) carbodiimide include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide and bis(nonylphenyl)carbodiimide.

The refrigerating machine oil preferably further contains an antiwear agent among the above additives. Preferable examples of the antiwear agent include phosphate esters, thiophosphate esters, sulfide compounds and zinc dialkyldithiophosphate. Among the phosphate esters, triphenyl phosphate (TPP) and tricresyl phosphate (TCP) are preferable. Among the thiophosphate esters, triphenyl phosphorothionate (TPPT) are preferable. Monosulfide compounds are preferably the sulfide compound because the stability of the refrigerating machine oil is assured and the deterioration of copper extensively used inside a refrigerating apparatus can be reduced.

The refrigerating machine oil preferably further contains an antioxidant among the above additives. Examples of the antioxidant include phenolic compounds such as di-tert-butyl-p-cresol and amine compounds such as alkyl diphenylamine. The refrigerating machine oil can contain a phenolic compound as the antioxidant in 0.02 to 0.5 mass % based on a total amount of the refrigerating machine oil.

The refrigerating machine oil preferably further contains a friction modifier, an extreme pressure agent, a rust preventive, a metal deactivator and a defoaming agent among the above additives. Examples of the friction modifier include aliphatic amines, aliphatic amides, aliphatic imides, alcohols, esters, phosphate amine salts and phosphite amine salts. Examples of the extreme pressure agent include sulfurized olefins and sulfurized oils. Examples of the rust preventive include esters or partial esters of alkenyl succinic acid. Examples of the metal deactivator include benzotriazoles and benzotriazole derivatives. Examples of the defoaming agent include silicone compounds and polyester compounds.

The kinematic viscosity of the refrigerating machine oil at 40° C. is preferably 3 $mm^2/s$ or more, more preferably 4 $mm^2/s$ or more and further preferably 5 $mm^2/s$ or more in light of improving the lubricity. The kinematic viscosity of the refrigerating machine oil at 40° C. is preferably 1000 $mm^2/s$ or less, more preferably 500 $mm^2/s$ or less and further preferably 400 $mm^2/s$ or less in light of improving oil return properties. The kinematic viscosity of the refrigerating machine oil at 100° C. is preferably 1 $mm^2/s$ or more and more preferably 2 $mm^2/s$ or more in light of improving the stability. The kinematic viscosity of the refrigerating machine oil at 100° C. is preferably 100 $mm^2/s$ or less and more preferably 50 $mm^2/s$ or less in light of improving oil return properties. The kinematic viscosity referred in the present invention means a kinematic viscosity measured in conformity with JIS K2283:2000.

The pour point of the refrigerating machine oil may preferably be −10° C. or less and more preferably −20° C. or less. The pour point referred in the present invention means a pour point measured in conformity with JIS K2269-1987.

The volume resistivity of the refrigerating machine oil may preferably be $1.0 \times 10^9$ Ω·m or more, more preferably $1.0 \times 10^{10}$ Ω·m or more and further preferably $1.0 \times 10^{11}$ Ω·m or more. When the refrigerating machine oil is used particularly for a hermetic refrigerating machine, an electric insulation is preferably high. The volume resistivity referred in the present invention means a volume resistivity measured at 25° C. in conformity with JIS C2101:1999.

The moisture content of the refrigerating machine oil may preferably be 200 ppm or less, more preferably 100 ppm or less and further preferably 50 ppm or less based on a total amount of the refrigerating machine oil. When used particularly for a hermetic refrigerating machine, a moisture content is preferably low in light of the influence to the thermal and chemical stability and the electric insulation of the refrigerating machine oil.

The acid value of the refrigerating machine oil is preferably 10.0 mgKOH/g or less, more preferably 1.0 mgKOH/g or less and further preferably 0.1 mgKOH/g or less in light of preventing the corrosion of the metals used in a refrigerating machine or pipes and the decomposition of the esters contained in the refrigerating machine oil. Similarly, the hydroxyl value of the refrigerating machine oil is preferably 50.0 mgKOH/g or less, more preferably 30.0 mgKOH/g or less and further preferably 10.0 mgKOH/g or less. The acid value referred in the present invention means an acid value measured in conformity with JIS K2501:2003. The hydroxyl value referred in the present invention means a hydroxyl value measured in conformity with JIS K0070:1992.

The ash content of the refrigerating machine oil may preferably be 100 ppm or less and more preferably 50 ppm or less in light of enhancing the thermal and chemical stability of the refrigerating machine oil and reducing the occurrence of sludge. The ash content referred in the present invention means an ash content measured in conformity with JIS K2272:1998.

The ester base oil according to the present embodiment is preferably used as a constituent component of the refrigerating machine oil used with a mildly flammable hydrofluorocarbon refrigerant or as a constituent component of the working fluid composition for a refrigerating machine containing the refrigerating machine oil and the mildly flammable hydrofluorocarbon refrigerant.

The ester base oil according to the present embodiment is preferably used for producing a refrigerating machine oil used with a mildly flammable hydrofluorocarbon refrigerant or for a working fluid composition for a refrigerating machine containing the refrigerating machine oil and the mildly flammable hydrofluorocarbon refrigerant.

The refrigerating machine oil according to the present embodiment is used with the mildly flammable hydrofluorocarbon refrigerant and the working fluid composition for a refrigerating machine according to the present embodiment contains the refrigerating machine oil according to the present embodiment and a mildly flammable hydrofluorocarbon refrigerant. The hydrofluorocarbon refrigerant includes saturated hydrofluorocarbon refrigerants (also called hydrofluoroalkane refrigerant) and unsaturated hydrofluorocarbon refrigerants (also called hydrofluoroalkene refrigerant, hydrofluoroolefin refrigerant or HFO refrigerant). The mildly flammable refrigerant in the present invention means the refrigerants included in Class A2L of Flammability Classification in accordance with ASHRAE (The American Society of Heating, Refrigerating and Air-conditioning Engineers) 34.

Examples of the mildly flammable hydrofluorocarbon refrigerant include difluoromethane (HFC-32), 1,3,3,3-tetrafluoropropene (HFO-1234ze) and 2,3,3,3-tetrafluoropropene (HFO-1234yf). Preferable mildly flammable hydrofluorocarbon refrigerant is 1,3,3,3-tetrafluoropropene (HFO-1234ze) or 2,3,3,3-tetrafluoropropene (HFO-1234yf).

The refrigerant used with the refrigerating machine oil of the present embodiment may be refrigerants consisting of the mildly flammable hydrofluorocarbon refrigerant or may be a mixed refrigerant of the mildly flammable hydrofluorocarbon refrigerant and other refrigerants. Examples of the other refrigerants include hydrofluorocarbon refrigerants other than the mildly flammable hydrofluorocarbon refrigerant, fluorine-containing ether refrigerants such as perfluoroethers, bis(trifluoromethyl)sulfide refrigerants, trifluoroiodomethane refrigerants and natural refrigerants such as dimethyl ether, carbon dioxide, ammonia and hydrocarbon. Other refrigerants preferably used are refrigerants consisting of compounds free of an oxygen atom.

Examples of the hydrofluorocarbon refrigerant other than the mildly flammable hydrofluorocarbon refrigerant include trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc) and 1,2,3,3,3-pentafluoropropene (HFO-1225ye).

Preferable hydrocarbon refrigerant is hydrocarbons having 3 to 5 carbon atoms, and examples thereof include methane, ethylene, ethane, propylene, propane, cyclopropane, normal butane, isobutane, cyclobutane, methylcyclopropane, 2-methylbutane, normal pentane or mixtures of two or more of these. Among these, it is preferable to use hydrocarbon refrigerants which are a gas at 25° C. and one atmospheric pressure such as propane, normal butane, isobutane, 2-methylbutane or mixtures of these.

Examples of the fluorine-containing ether refrigerant include HFE-134p, HFE-245mc, HFE-236mf, HFE-236me, HFE-338mcf, HFE-365mcf, HFE-245mf, HFE-347mmy, HFE-347mcc, HFE-125, HFE-143m, HFE-134m and HFE-227me.

When the refrigerant is a mixed refrigerant, the mixing ratio of the mildly flammable hydrofluorocarbon refrigerant to other refrigerants (mass ratio, mildly flammable hydrofluorocarbon refrigerant:other refrigerants) may be 1:99 to 99:1 and may also be 5:95 to 95:5.

In the refrigeration and air conditioning equipment, the refrigerating machine oil is typically present in the mildly flammable hydrofluorocarbon refrigerant alone or in the working fluid composition for a refrigerating machine mixed with a mixed refrigerant. The content of the refrigerating machine oil in the working fluid composition for a refrigerating machine may be, for example, 1 to 500 mass parts or 2 to 400 mass parts with respect to 100 mass parts of the refrigerant.

The refrigerating machine of the present embodiment is equipped at least with a refrigerant circulating system having a refrigerant compressor, a gas cooler, an expansion mechanism and an evaporator. The above refrigerating machine include cooling units in the automotive air conditioners, dehumidifiers, fridge storages, freezing refrigerating warehouses, vending machines, display cases and chemical plants, air conditioners for house, packaged air conditioners and heat pumps for water heater.

FIG. 1 is a schematic drawing illustrating an example of a configuration of the refrigerating machine according to the present embodiment. As illustrated in FIG. 1, a refrigerating machine 10 is equipped at least with, for example, a refrigerant circulating system with a refrigerant compressor 1, a gas cooler 2, an expansion mechanism 3 (capillary, expansion valve, etc.) and an evaporator 4, which are sequentially connected by a flow channel 5. In such a refrigerant circulating system, first, the mildly flammable hydrofluorocarbon refrigerant (hereinafter also referred to simply as "refrigerant") of a high temperature (typically 70 to 120° C.) discharged from the refrigerant compressor 1 into the flow channel 5 to become a high dense fluid (supercritical fluid) at the gas cooler 2. Subsequently, the refrigerant is liquefied when passing through the narrow flow channel provided in the expansion mechanism 3 and further vaporized at the evaporator 4 where the temperature is reduced (typically −40 to 0° C.).

In the refrigerant compressor 1 of FIG. 1, a small amount of the refrigerant and a large amount of the refrigerating machine oil are present together under high temperature (typically 70 to 120° C.) conditions. The refrigerant discharged from the refrigerant compressor 1 to the flow channel 5 is gaseous and contains a small amount of (usually 1 to 10%) the refrigerating machine oil in the form of mist, in which a small amount of the refrigerant is dissolved (dot a in FIG. 1). Next, in the gas cooler 2, the gaseous refrigerant is compressed to be a high dense fluid, wherein a large amount of the refrigerant and a small amount of the refrigerating machine oil are present together under comparatively high temperature (typically about 50 to 70° C.) conditions (dot b in FIG. 1). Furthermore, the mixture of a large amount of the refrigerant and a small amount of the refrigerating machine oil is sequentially delivered to the expansion mechanism 3 and the evaporator 4, where the temperature rapidly drops (typically −40 to 0° C.) (dots c and d in FIG. 1), and returned back to the refrigerant compressor 1.

When the composition containing the ester base oil according to the present embodiment is used as the refrigerating machine oil, refrigerating machines using the mildly flammable hydrofluorocarbon refrigerants as described above can be made flame retardant.

The refrigerating machine oil and the working fluid composition for a refrigerating machine of the present embodiment are preferably used for air conditioners and fridge storages with a reciprocating or rotary hermetic compressor or for open- or sealed-type automotive air conditioners. The refrigerating machine oil and the working fluid composition for a refrigerating machine of the present embodiment are preferably used for cooling units in dehumidifiers, water heaters, freezers, freezing refrigerating warehouses, vending machines, display cases and chemical plants. The refrigerating machine oil and the working fluid composition for a refrigerating machine of the present embodiment are also preferably used for the refrigerating machine with a centrifugal compressor.

EXAMPLES

Hereinafter, the present invention is further specifically described with reference to Examples, but is not limited thereto.

First, ester a was synthesized in accordance with the following synthesis procedure A or B.

(Synthesis Procedure A of Ester a)

A 2 L-four-neck flask (reactor) equipped with a thermometer, a nitrogen introduction tube, a stirrer, a dimroth condenser and a 30 mL-oil water separation tube was charged with the mixed fatty acid of 2-ethylhexanoic acid and 3,5,5-trimethylhexanoic acid mixed in the ratio shown in Tables 1, 2 and pentaerythritol in a ratio (molar ratio) of the mixed fatty acid:pentaerythritol=5:1. After further charging a catalyst as necessary, the reactor was heated using a mantle heater in a nitrogen gas stream, and when once reached 200° C., the mixed fatty acid and pentaerythritol were reacted until a hydroxyl value of the ester was 3 mgKOH/g or less. A pressure inside the reactor was then reduced to 50 Torr and excessive fatty acid was distilled off until an acid value was 5 mgKOH/g or less. The reactor was cooled to 85° C., and subsequently 1.5 equivalent of potassium hydroxide calculated from the above acid value was diluted with deionized water to prepare a 10% aqueous solution which was then added to the reaction solution and stirred for 1 hour. After stopped stirring, the reaction solution was allowed to stand for 30 minutes and the aqueous layer separated at the bottom layer was removed. Subsequently, deionized water in 20 mass % with respect to the total amount of reaction solution was added thereto, stirred at 85° C. for 10 minutes and allowed to stand for 15 minutes, followed by repeating five times the procedure of removing the separated aqueous layer. The reaction solution was dehydrated by stirring at 30 Torr, 100° C. for 1 hour. Activated bleaching earth in 2 mass % with respect to the total amount of reaction solution was finally added, stirred for 1 hour under the conditions of 80° C. and 30 Torr and the solution was filtered to remove the adsorbent, whereby the intended ester was obtained.

(Synthesis Procedure B of Ester a)

A 2 L-four-neck flask (reactor) equipped with a thermometer, a nitrogen introduction tube, a stirrer, a dimroth condenser and a 30 mL-oil water separation tube was charged with the mixed fatty acid of 2-ethylhexanoic acid and 3,5,5-trimethylhexanoic acid mixed in the ratio shown in Tables 1, 2 and pentaerythritol in a ratio (molar ratio) of the mixed fatty acid:pentaerythritol=5:1. After further charging a catalyst as necessary, the reactor was heated using a mantle heater in a nitrogen gas stream, and when once reached 200° C., the mixed fatty acid and pentaerythritol were reacted until a hydroxyl group of the ester was 3 mgKOH/g or less. The reactor was cooled to 85° C., and subsequently 1.5 equivalent of potassium hydroxide calculated from the acid value of reaction product was diluted with deionized water to prepare a 10% aqueous solution which was then added to the reaction solution and stirred for 1 hour. After stopped stirring, the reaction solution was allowed to stand for 30 minutes and the aqueous layer separated at the bottom layer was removed. Subsequently, deionized water in 20 mass % with respect to the total amount of reaction solution was added thereto, stirred at 85° C. for 10 minutes and allowed to stand for 15 minutes, followed by repeating five times the procedure of removing the separated aqueous layer. The reaction solution was dehydrated by stirring at 30 Torr, 100° C. for 1 hour to obtain the intended ester.

Next, base oils having the compositions shown in Tables 1 and 2 were prepared using ester a obtained by the synthesis procedure A or B and the following ester b and ester c.

Ester b: a tetraester of 2-ethylhexanoic acid and pentaerythritol

Ester c: a tetraester of 3,5,5-trimethylhexanoic acid and pentaerythritol

The obtained base oils were measured for the Mw/Mn, flash point and spontaneous ignition point and tested for the low temperature precipitation in accordance with the following test methods. The results are shown in Tables 1 and 2.

(Mw/Mn Measurement)

Each base oil was diluted using chloroform as a solvent to prepare a solution having a sample concentration of 1 mass %. The solution was analyzed using a GPC apparatus (Waters Alliance 2695). The analysis was carried out by a refractive index detector at a solvent flow rate of 1 ml/min using a column with an analytical molecular weight from 100 to 10000. Note that the relationship of the column retention time and the molecular weight was evaluated using a polypropylene glycol standard having a definite molecular weight and a calibration curve was separately created to determine the molecular weight from the obtained retention time.

(Measurement of Flash Point and Spontaneous Ignition Point)

Flash point: JIS K2265-4:2007

Spontaneous ignition point: ASTM E 659-1978

(Low Temperature Precipitation Test)

The base oils, each of which was placed in a test tube and immersed in a dry-ice ethanol bath (−70° C.) for 24 hours, were observed for the presence of white turbidity.

TABLE 1

| | | Example 1 | Example 2 | Example 3 | Example 4 |
|---|---|---|---|---|---|
| Ratio of mixed fatty acids (mol %) | 2-Ethylhexanoic acid | 30 | 50 | 30 | 50 |
| | 3,5,5-Trimethylhexanoic acid | 70 | 50 | 70 | 50 |
| | Synthesis procedure of ester a | A | A | A | A |
| Base oil composition (mass %) | Ester a | Balance | Balance | Balance | Balance |
| | Ester b | 3 | 1 | 10 | 12 |
| | Ester c | 3 | 5 | 4 | 20 |
| Base oil property | Mw/Mn | 1.06 | 1.09 | 1.15 | 1.18 |
| | Flash point (° C.) | 250 | 247 | 249 | 245 |
| | Spontaneous ignition point (° C.) | 398 | 403 | 387 | 394 |
| | Low temperature precipitation test | Not detected | Not detected | Not detected | Not detected |

TABLE 2

| | | Comp. Example 1 | Comp. Example 2 | Comp. Example 3 | Comp. Example 4 |
|---|---|---|---|---|---|
| Ratio of mixed fatty acids (mol %) | 2-Ethylhexanoic acid | 90 | 30 | 30 | 50 |
| | 3,5,5-Trimethylhexanoic acid | 10 | 70 | 70 | 50 |
| | Synthesis procedure of ester a | A | A | B | B |
| Base oil composition (mass %) | Ester a | Balance | Balance | Balance | Balance |
| | Ester b | 0 | 0 | 0 | 5 |
| | Ester c | 0 | 40 | 0 | 5 |
| Base oil property | Mw/Mn | 1.04 | 1.05 | 1.21 | 1.25 |
| | Flash point (° C.) | 188 | 249 | 212 | 197 |
| | Spontaneous ignition point (° C.) | 336 | 402 | 355 | 365 |
| | Low temperature precipitation test | Detected | Detected | Detected | Detected |

The refrigerating machine oils of Examples 1 to 4, when used with the mildly flammable hydrofluorocarbon refrigerant in the refrigerating machine, can be flame retardant.

REFERENCE SIGNS LIST

1 . . . Refrigerant compressor, 2 . . . Gas cooler, 3 . . . Expansion mechanism, 4 . . . Evaporator, 5 . . . Flow channel, 10 . . . Refrigerating machine

The invention claimed is:

1. A refrigerating machine oil comprising:
an ester base oil obtained from pentaerythritol and mixed fatty acids of a fatty acid having 8 carbon atoms and a fatty acid having 9 carbon atoms,
wherein a ratio of a weight average molecular weight Mw to a number average molecular weight Mn, Mw/Mn, of the ester base oil is 1.06 to 1.20;
wherein said ester base oil has a flash point of 220° C. or more and a spontaneous ignition point of said ester base oil is 370° C. or more.

2. A working fluid composition for a refrigerating machine comprising the refrigerating machine oil according to claim 1 and a mildly flammable hydrofluorocarbon refrigerant.

3. A method for improving flame retardancy of a refrigerating machine comprising a mildly flammable hydrofluorocarbon refrigerant, the method comprising utilizing a composition comprising, as a refrigerating machine oil, an ester base oil obtained from pentaerythritol and mixed fatty acids of a fatty acid having 8 carbon atoms and a fatty acid having 9 carbon atoms, wherein a ratio of a weight average molecular weight Mw to a number average molecular weight Mn, Mw/Mn, of the ester base oil is 1.06 to 1.20;
wherein said ester base oil has a flash point of 220° C. or more and a spontaneous ignition point of said ester base oil is 370° C. or more.

* * * * *